(12) United States Patent
Thomas

(10) Patent No.: US 6,571,962 B2
(45) Date of Patent: Jun. 3, 2003

(54) CARTRIDGE FILTER ELEMENT WITH HOUSING SEAL RETAINER

(75) Inventor: Chad M. Thomas, Jackson, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/845,954

(22) Filed: Apr. 30, 2001

(65) Prior Publication Data

US 2002/0158006 A1 Oct. 31, 2002

(51) Int. Cl.$^7$ .............................................. B01D 27/00
(52) U.S. Cl. .................... 210/457; 210/450; 210/497.01
(58) Field of Search ................................ 210/438, 440, 210/445, 450, 457, 493.2, 497.01, 437, 443, 444, 451, 456, 458; 55/502

(56) References Cited

U.S. PATENT DOCUMENTS

| | | | |
|---|---|---|---|
| 2,696,915 A | 12/1954 | Kasten et al. ................. 210/164 |
| 3,000,467 A | 9/1961 | Bowers ....................... 183/2.5 |
| 4,114,906 A | 9/1978 | Jelinek ........................ 277/166 |
| 4,254,960 A | 3/1981 | Jelinek ........................ 277/12 |
| 4,293,135 A | 10/1981 | Wallace ........................ 277/9 |
| 4,380,856 A | 4/1983 | Wallace ........................ 29/412 |
| 4,502,955 A | 3/1985 | Schaupp ..................... 210/149 |
| 4,502,956 A | 3/1985 | Wilson et al. .............. 210/248 |
| 4,565,629 A | 1/1986 | Wilson et al. .............. 210/248 |
| 4,626,348 A | 12/1986 | Stone ......................... 210/248 |
| 4,836,923 A | 6/1989 | Popoff et al. ............... 210/232 |
| 5,015,376 A | 5/1991 | Picek .......................... 210/317 |
| 5,127,661 A | 7/1992 | Franson et al. ............. 277/152 |
| 5,173,186 A | 12/1992 | Spafford et al. ............ 210/455 |
| 5,250,179 A | 10/1993 | Spearman ................... 210/315 |
| 5,490,930 A | 2/1996 | Krull .......................... 210/443 |
| 5,547,572 A | 8/1996 | Stone ......................... 210/232 |
| 5,622,623 A | 4/1997 | Stone ......................... 210/232 |
| 5,670,042 A | 9/1997 | Clausen et al. ............. 210/238 |
| 5,718,825 A | 2/1998 | Greive et al. ............... 210/298 |
| 5,753,120 A * | 5/1998 | Clausen et al. ............. 210/438 |
| 5,770,065 A | 6/1998 | Popoff et al. ............... 210/232 |
| 5,779,903 A | 7/1998 | Smith et al. ................ 210/440 |
| 5,855,634 A | 1/1999 | Berfield ........................ 55/472 |
| 5,904,844 A | 5/1999 | Stone ......................... 210/232 |
| 5,922,196 A | 7/1999 | Baumann .................... 210/232 |
| 6,015,492 A | 1/2000 | Popoff et al. ............... 210/238 |
| 6,016,923 A | 1/2000 | Baumann .................... 210/440 |
| 6,053,334 A | 4/2000 | Popoff et al. ............... 210/438 |
| 6,086,763 A | 7/2000 | Baumann .............. 210/497.01 |
| 6,146,527 A | 11/2000 | Oelschlaegel .............. 210/232 |

FOREIGN PATENT DOCUMENTS

| | | |
|---|---|---|
| EP | 0 912 225 B1 | 2/1998 |
| WO | WO 98/36817 | 8/1998 |

* cited by examiner

Primary Examiner—Matthew O. Savage
(74) Attorney, Agent, or Firm—Woodard, Emhardt, Naughton, Moriarty & McNett LLP

(57) ABSTRACT

A cover encloses a filter cartridge in an outer housing. The cover has an unfiltered fluid inlet channel and a concentric filtered fluid outlet channel. The filter cartridge includes a filter media with a central passage. An upper endplate is provided on the upper end of the filter media, and the upper endplate has oblong openings defined therein. A separate seal retainer is attached to the upper endplate. The retainer has an outer body portion and a concentric inner body portion extending from the outer body portion. The outer body portion has a lower outwardly opening channel, and the inner body portion has an upper outwardly opening channel. An outer seal is provided in the lower channel to seal the filter cartridge with the housing. An inner seal is provided in upper channel to seal the inlet channel from the outlet channel in the cover.

12 Claims, 8 Drawing Sheets

CARTRIDGE FILTER ELEMENT WITH HOUSING SEAL RETAINER

BACKGROUND OF THE INVENTION

The present invention relates in general to the design of a replaceable cartridge filter element which is received by an outer housing. More specifically the present invention relates to the design of a replaceable cartridge filter element which includes a seal for sealing the interface between the cartridge filter and the outer housing. The housing-to-element interface at the open (upper) end of the housing is not sealed unless the cartridge filter element is properly installed.

One of the design challenges with any replaceable cartridge filter element is to ensure that the new element will be compatible with the housing which receives the cartridge filter element. It is important to understand the housing design and the locations where fluid leakage can occur. Since there are a wide variety of housing styles as well as cartridge filter elements for various fluids, there are numerous sealing concepts found in the prior art. Even with a fairly routine cartridge filter element design, there is still a wide range of endplate, cover, and housing configurations. Various structural features of these configurations help to seal the element in position and help to cooperatively create the requisite sealing at the interfaces where fluid leakage could occur.

After the cartridge filter element is properly seated and sealed within the housing, the assembly is ready to be attached to or into the engine. With oil filters, the assembly is often connected to the engine block mounting base. Once mounted, the fluid flow path for the oil to be filtered enters the annular space between the element and the housing. The oil passes through the element from the outside and exits by way of the hollow interior. A nutplate may be used in order to provide the inlet flow apertures for the oil entering from the mounting base as well as the centered flow exit.

When the fluid to be filtered is fuel, the mounting and connection to the fuel source is different than what is typically provided for oil filtration. Instead of mounting to an engine block mounting base, the fuel filter is positioned in the engine and fuel inlet and fuel outlet lines are connected to the fuel filter inlet and the fuel filter outlet, respectively. For fuel filters, the housing and lid designs are different from those typically associated with lube filters and those differences will be described herein in the context of the present invention. An important aspect in the design of fluid filters of the type described herein is the elimination of leakage and preventing a bypass of the filter element by the "dirty" fuel.

In this type of filter design, the cartridge filter element is sealed in order to control the fuel flow through the element by way of the desired flow path. The filter design needs to prevent any short cut or short circuit flow paths which would result in the dirty fuel bypassing the filtering media. The present invention addresses this sealing concern in a novel and unobvious manner by the use of a plastic seal retainer which is ultrasonically welded to the plastic endplate of the fuel filter element. The retainer carries an outer, elastomeric seal that seals against the filter housing in cooperation with a closing lid. Also included is a central, generally cylindrical portion that receives an O-ring which is used to seal the top of the cartridge filter element to the lid around the fuel exit aperture.

While the idea of using an outer seal for sealing directly to the housing and lid is believed to be known, the typical approach does not use a separate retainer component (plastic) which is ultrasonically welded to the plastic endcap which in turn is bonded to the filtering media. By welding a special retainer to the endplate, it is easier to selectively add the retainer or not add it, without needing to change the design of the endplate. It is also possible to add the same style of retainer to various styles of endplates. Overall, it should be easier, less complicated, and less expensive to mold the desired endplate separately from the retainer and then mold a "standard" retainer which can be used in combination with a number of different endplate designs.

The present invention also contemplates a uniquely styled upper endplate which includes a shallow inner, annular projection designed to extend only a short distance into the hollow interior of the element. The uniquely styled lower endplate includes a much longer central, generally cylindrical projection. This lower endplate projection extends from the lower end of the element toward the upper endplate and is configured with a spaced series of fuel flow apertures. This unique design of the lower endplate simplifies the manufacturing process for the fuel flow apertures. The outer housing includes a base portion and an integral center tube. The cartridge filter element is positioned over this center tube. The flow passing through the filter element (outside to inside) must establish an exit flow path. This exit flow path is through the fuel filtering media from the outside, to the inside, and ultimately in an upward axial direction. It is important to configure the flow path and the various seals in order to isolate the dirty fuel from the fuel being filtered and to prevent the dirty fuel from bypassing the filtering element and exiting to the engine with the filtered fuel. Accordingly, one of the unique aspects of the present invention is the seal design used to establish a leak-free seal between the fuel flow exit apertures which are designed to receive the filtered fuel and the dirty fuel which can migrate below the filter element and flow upwardly toward the (clean) fuel flow exit apertures.

SUMMARY OF THE INVENTION

One embodiment of the present invention concerns a filter-housing assembly. The assembly includes a housing having a hollow interior and a cover that encloses the interior of the housing. The cover has an unfiltered fluid inlet channel and a concentric filtered fluid outlet channel defined therein. A filter cartridge is provided in the interior of the housing. The filter cartridge includes a filter media constructed and arranged to filter the fluid. The filter media has a central passage defined therein between first and second ends of the filter media. A first endplate is provided on the first end of the filter media, and the first endplate has a central opening aligned with the central passage. The first endplate has one or more peripheral openings defined therein around the central opening. A separate seal retainer attached to the first endplate, and the retainer has an outer body portion and a concentric inner body portion that extends from the outer body portion. The outer body portion has a first outwardly opening channel defined therein, and the inner body portion has a second outwardly opening channel defined therein. An outer seal is provided in the first channel, and the outer seal is constructed and arranged to seal the filter housing. An inner seal is provided in the second channel, and the inner seal is constructed and arranged to seal the inlet channel from the outlet channel of the cover.

Another embodiment concerns a filter cartridge for filtering fluid. The filter cartridge includes a filter media that is constructed and arranged to filter the fluid. The filter media has a central passage defined therein between first and second ends of the filter media. A first endplate is provided on the first end of the filter media, and the first endplate has a central opening aligned with the central passage. The first endplate has one or more peripheral openings defined therein around the central opening. A separate seal retainer is attached to the first endplate. The retainer has an outer body portion and a concentric inner body portion extending from the outer body portion. The outer body portion has a first outwardly opening channel, and the inner body portion has a second outwardly opening channel defined therein. An outer seal is provided in the first channel, and an inner seal provided in the second channel. A second endplate has a tube extending within the passage of the filter media. The tube has one or more fluid passage apertures defined at one end of the tube proximal the first endplate. The apertures and the first endplate define one or more fluid openings.

A further embodiment concerns a filter cartridge. The filter cartridge includes a cylindrical filter media constructed and arranged to filter fluid. The filter media has a central passage defined therein between first and second ends of the filter media. A first endplate is provided on the first end of the filter media. The first endplate has a central opening aligned with the central passage. The first endplate has one or more peripheral openings defined therein around the central opening. A separate seal retainer is attached to the first endplate. The retainer has an outer body portion and a concentric inner body portion that extends from the outer body portion. The outer body portion is constructed and arranged to retain an outer seal, and the inner body portion is constructed and arranged to retain an inner seal. A second endplate has a tube that extends from the second endplate within the central passage of the filter media. The tube has one or more fluid passage apertures defined at one end of the tube proximal the first endplate. The tube has an inside surface with an inwardly extending lip that extends from the inside surface. A center post gasket is coupled to the lip, and the center post gasket has a seal surface constructed and arranged to seal against a center post of a filter housing. The seal surface includes an upper conical surface portion, a lower conical surface portion, and a rounded surface portion provided between the upper and lower conical surface portions.

One object of the present invention is to provide an improved filter cartridge.

Related objects and advantages of the present invention will be apparent from the following description.

DESCRIPTION OF THE PREFERRED EMBODIMENTS

Figure 1:
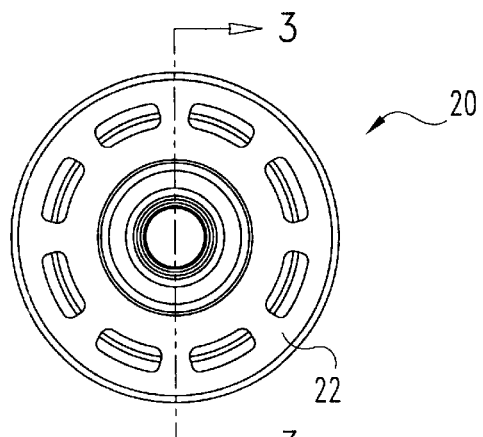
FIG. 1 is a top plan view of a fuel filter cartridge according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
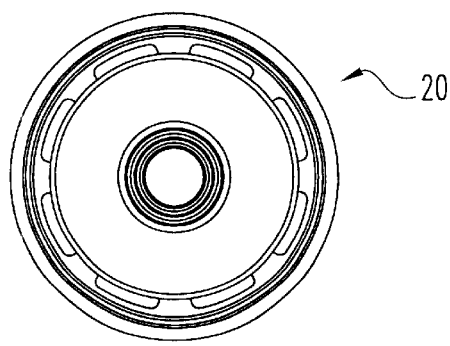
FIG. 2 is a bottom plan view of the FIG. 1 fuel filter cartridge.
Figure 3:
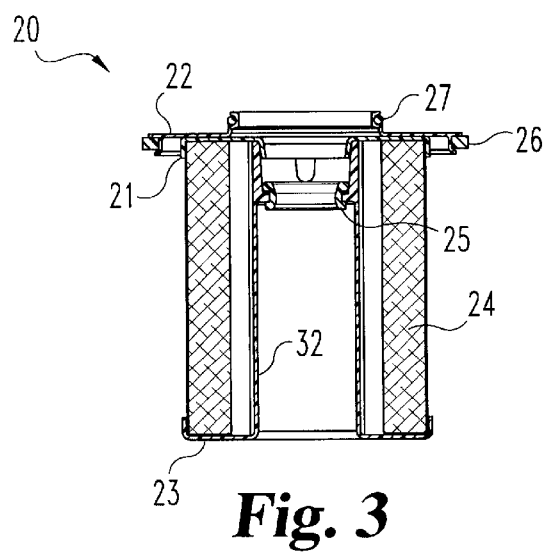
FIG. 3 is a front elevational view in full section of the FIG. 1 fuel filter cartridge as viewed along cutting plane 3—3 in FIG. 1.
Figure 4:
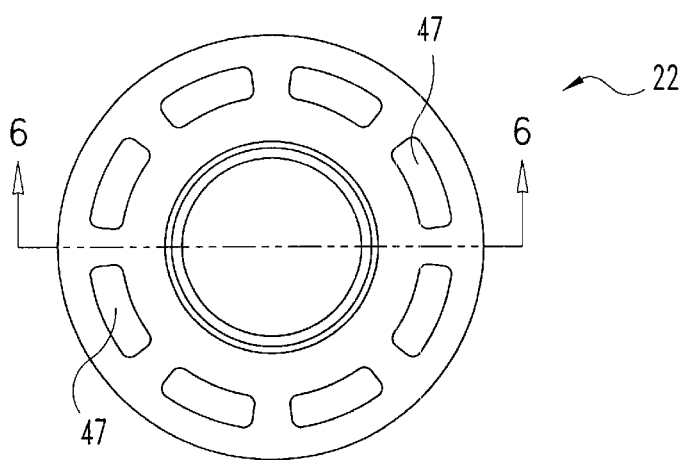
FIG. 4 is a top plan view of a retainer comprising part of the FIG. 1 fuel filter cartridge.
Figure 5:
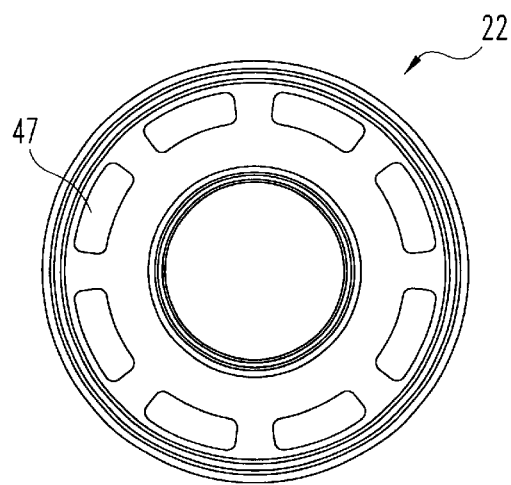
FIG. 5 is a bottom plan view of the FIG. 4 retainer.
Figure 6:
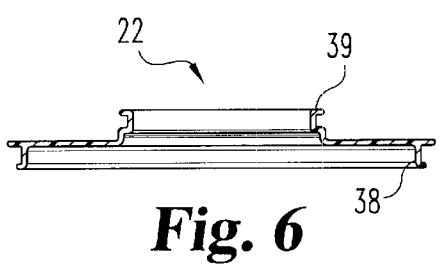
FIG. 6 is a front elevational view in full section of the FIG. 4 retainer as viewed along cutting plane 6—6 in FIG. 4.
Figure 7:
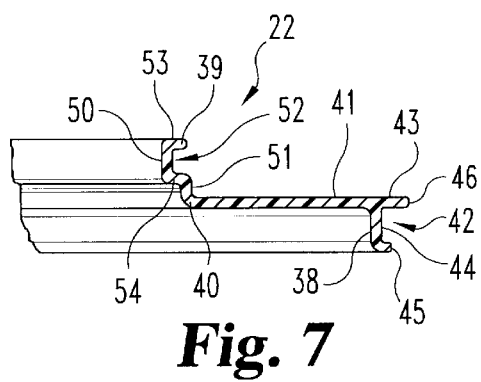
FIG. 7 is an enlarged, partial detail view of one portion of the FIG. 6 retainer.
Figure 18:
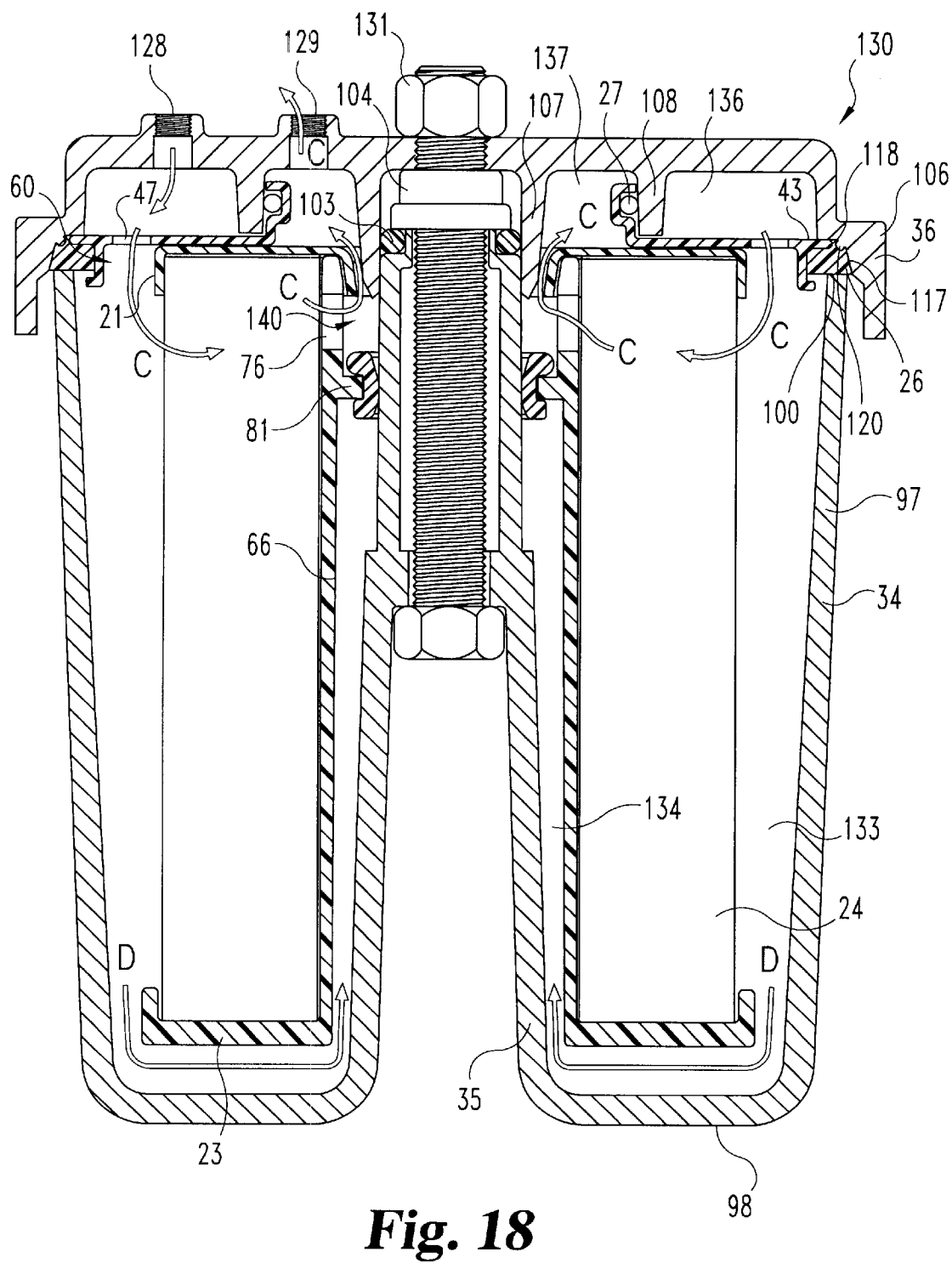
FIG. 18 is a partial, front elevational view in full section showing the FIG. 16 housing, the FIG. 17 cover, and the FIG. 1 fuel filter cartridge as assembled.

Referring to FIGS. 1, 2, and 3, there is illustrated a fuel filter cartridge (element) 20 configured as a replaceable cartridge for assembly into a fuel filter housing (see FIG. 18). FIGS. 1 and 2 illustrate the generally cylindrical form of the fuel filter cartridge 20. The sectioning geometric plane identified by line 3—3 which extends through the center of the fuel filter cartridge results in the full section illustration of FIG. 3.

With continued reference to FIG. 3, the fuel filter cartridge 20 includes an upper endplate 21, seal retainer 22, lower endplate 23, filtering media 24, center post sealing gasket 25, outer seal 26, and inner seal 27. The seal retainer 22 is secured to the upper endplate 21 and receives the outer seal 26 for sealing at the sidewall of the outer housing and lid or cover interface. The seal retainer 22 retains both the outer seal 26 and the inner seal 27. In one embodiment, the inner seal 27 is an o-ring seal. The sealing gasket 25 assembles onto an extended tubular portion 32 of the lower endplate 23 in order to prevent "dirty" fuel from bypassing the filtering media 24 and flowing directly to the fuel outlet apertures, which will be described in greater detail hereinafter.

Figure 16:
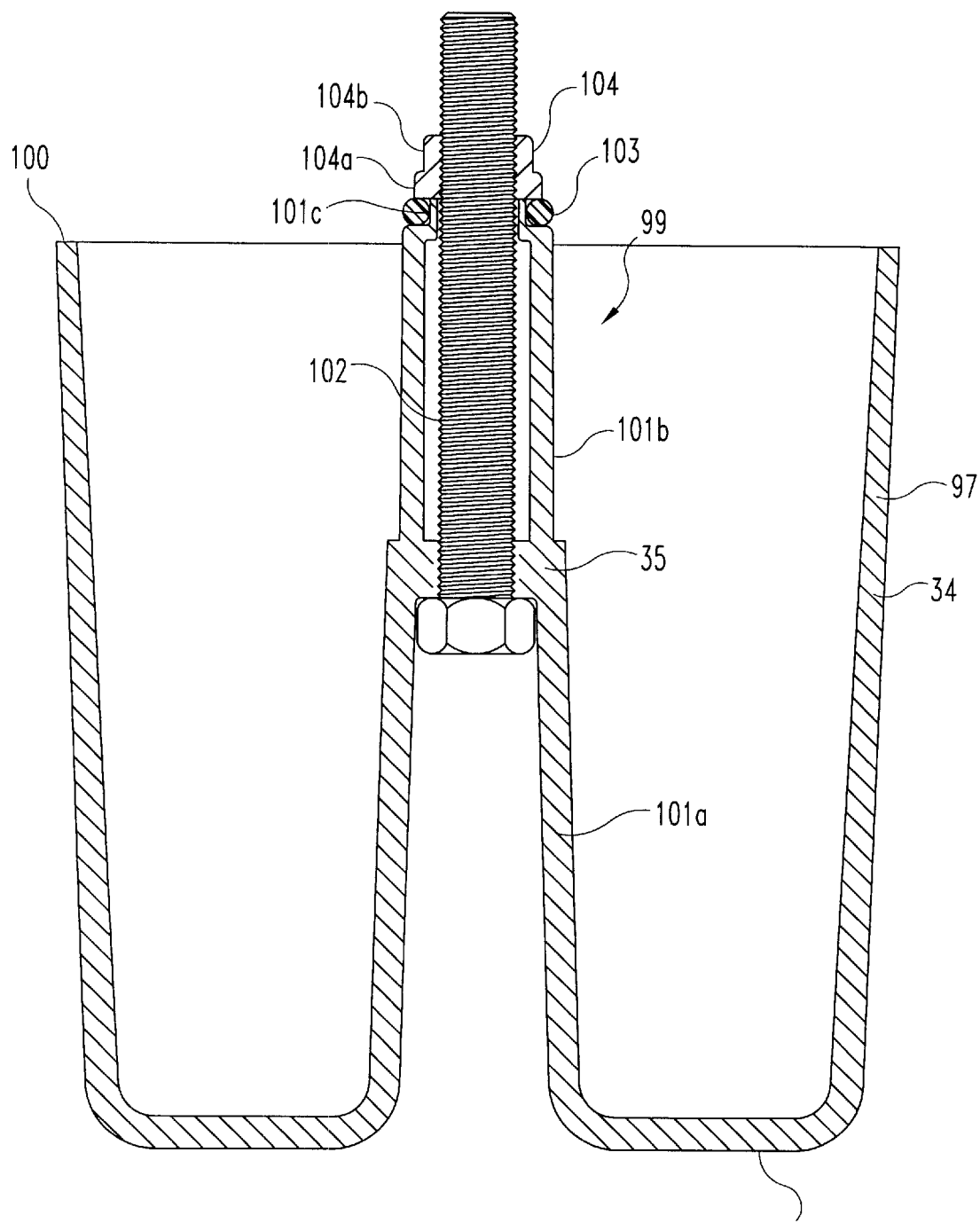
FIG. 16 is front elevational view in full section of a representative housing which is compatible with the design of the FIG. 1 fuel filter cartridge for receipt of that cartridge.
Figure 17:
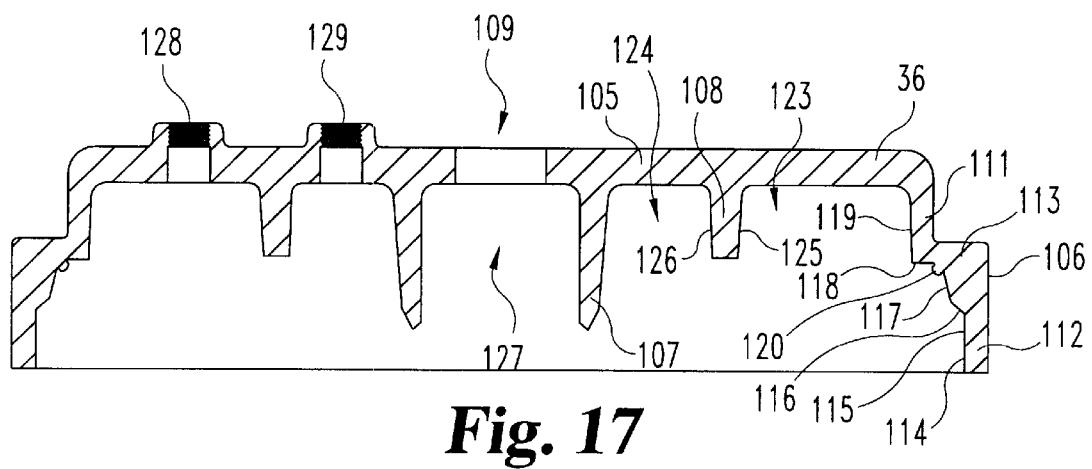
FIG. 17 is a front elevational view in full section of a cooperating cover which is compatible for use with the FIG. 16 housing in order to enclose the FIG. 1 fuel filter cartridge.

The seal retainer 22 is illustrated in greater detail in FIGS. 4–7. The seal retainer 22, as secured to the upper endplate 21, is illustrated in greater detail in FIGS. 8A–B. The lower endplate 23 is illustrated in greater detail in FIGS. 9–11. The sealing gasket 25 is illustrated in greater detail in FIGS. 12–15. A diagrammatic representation of a typical outer housing 34 with a center post 35 which would be suitable for use with the fuel filter cartridge 20 is illustrated in FIG. 16. A diagrammatic representation of a typical lid or cover 36 which would be suitable for use in cooperation with housing 34 is illustrated in FIG. 17. The combination of housing 34 and cover 36 shown with the fuel filter cartridge 20 is illustrated in FIG. 18.

With continued reference to FIGS. 4–7, the details of seal retainer 22 are illustrated. Retainer 22 is a unitary, annular member which is preferably molded out of suitable plastic material. The shape of retainer 22 can best be described as having a lower outer body portion 38 and a concentric upper inner body portion 39. While retainer 22 is unitary, the point of integral connection between body portion 38 and body portion 39 is at "corner" 40 which is an annular line.

Lower outer body portion 38 includes a substantially flat, annular plate portion 41 and a concentric, outwardly opening channel 42. Channel 42 is defined by a substantially flat upper lip 43, axial wall 44, and a substantially flat lower lip 45. Upper lip 43 is coincident with plate portion 41. Channel 42 is sized and shaped to receive outer seal 26. Outer seal 26 is an annular seal with a cross sectional wall geometry having a rectangular form. The wall thickness of seal 26 in an axial direction is approximately 0.14 inches (3.75 mm) which is approximately 0.029 inches (0.74 mm) less than the axial height of channel 42. The outside diameter of seal 26 is approximately 4.23 inches (10.745 cm) which is approximately 0.151 inches (3.84 mm) larger than the outside diameter of upper lip 43, or 0.075 inches (1.91 mm) on a side. This seal extension provides a sufficient mass of elastomeric material to be compressed for sealing to the upper edge of the outer housing 34 without bottoming out so as to expose the outer edge 46 of upper lip 43.

The annular plate portion 41 includes an equally-spaced series of eight (8) generally oblong slots (peripheral openings) 47 which provide the various fuel flow inlets. The entering fuel flows through these inlets 47 in order to reach the annular clearance space between the outer housing 34 and the filtering media 24. Each slot 47 extends approximately 31 degrees with approximately 14 degrees of plate material between each adjacent pair of oblong slots 47. The series of eight slots is shaped into an annular ring form.

The upper, inner body portion 39 includes a generally cylindrical shape defined by inner annular wall 50 and outer annular wall 51 which is concentric to wall 50. An outwardly opening channel 52 is defined by upper lip 53, wall 50, and lower lip 54. Channel 52 is sized and shaped to receive inner seal 27. Inner seal 27 has an outside diameter size of approximately 1.799 inches (45.69 mm). The inside diameter of channel 52 is approximately 1.812 inches (46.02 mm) such that the inner seal 27 must be stretched slightly in order to assemble and in this manner the inner seal 27 stays in position within channel 52.

Figure 8A:
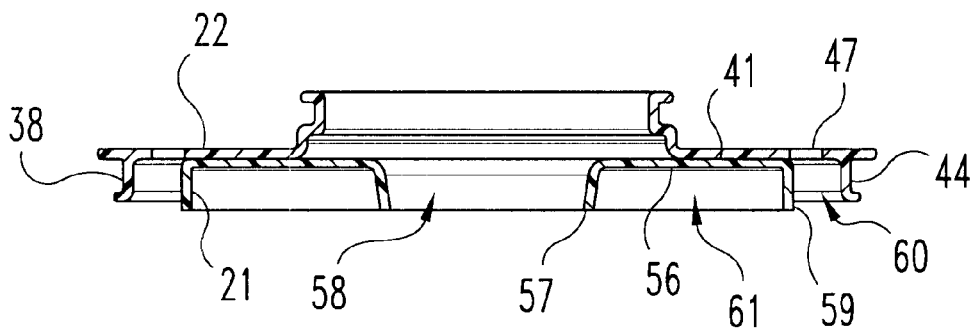
FIG. 8A is a front elevational view in full section of an endplate comprising part of the FIG. 1 fuel filter cartridge.
Figure 8B:
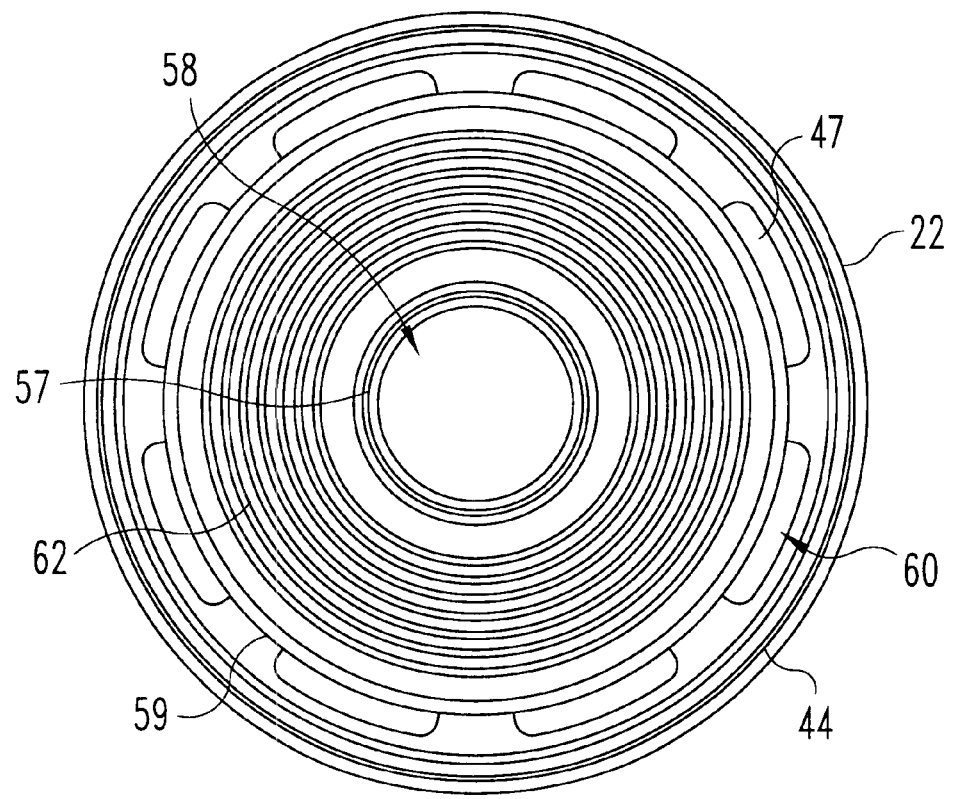
FIG. 8B is a bottom plan view of the FIG. 8A endplate.

As illustrated in FIGS. 8A–B, the seal retainer 22 is attached to the upper endplate 21. The upper endplate 21 includes an annular end wall 56 that is attached to the plate portion 41 of the seal retainer 22. In one embodiment, end wall 56 is ultrasonically welded to plate portion 41 so as to provide a fluid-tight seal between the two components. With this arrangement, conventional endplates 21 do not have to be redesigned for use with seals 26 and 27. Inner ring wall 57 of the endplate 21 extends away from the retainer 22 so as to define an inner opening 58 in the endplate 21. Outer annular wall 59 of the endplate 21, which is concentric with wall 57, extends away from the retainer 22. Between axial wall 44 of the retainer 22 and outer wall 59 of endplate 21, a fluid inlet channel 60 is formed. Oblong slots 47 are positioned over endplate 21 such that fluid can flow through slots 47 and into channel 60. As illustrated, walls 56, 57, and 59 define an upper filter media channel 61. Filter media channel 61 is sized so that an upper end portion of the filtering media 24 can fit therein. At channel 61, the filtering media 24 is attached to the upper endplate 21. In one embodiment, the filtering media 24 is epoxied to the endplate 21. As shown in FIG. 8B, a plurality of adhesion channels 62 are defined in the upper endplate 21 so as to ensure that the epoxy properly adheres to the upper endplate 21.

Figure 9:
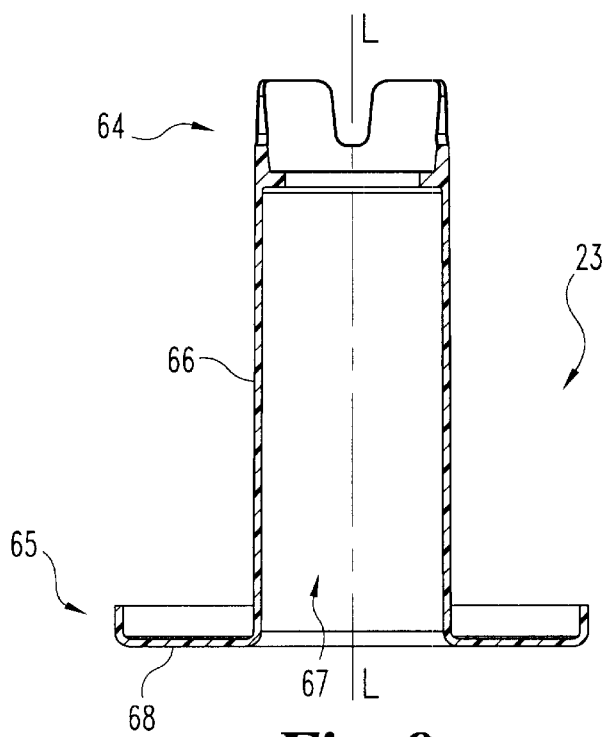
FIG. 9 is a front elevational view in full section of a lower endplate comprising part of the FIG. 1 fuel filter cartridge.
Figure 10:
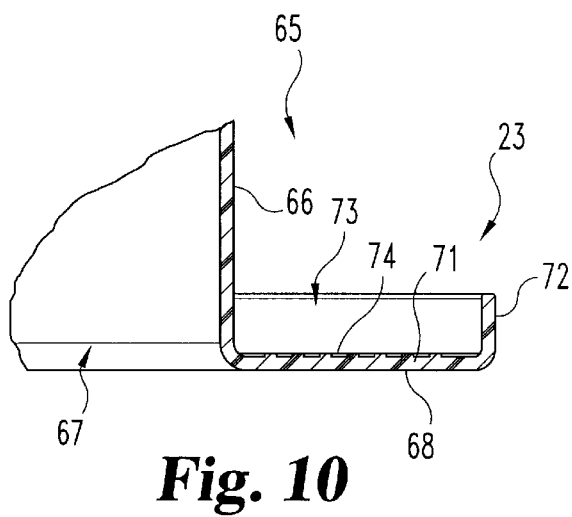
FIG. 10 is an enlarged, partial detail view of one portion of the FIG. 9 lower endplate.
Figure 11:
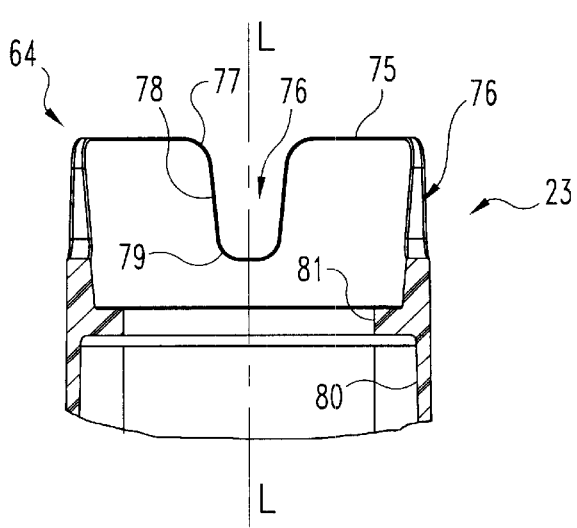
FIG. 11 is an enlarged, partial detail view of one portion of the FIG. 9 lower endplate.
Figure 12:
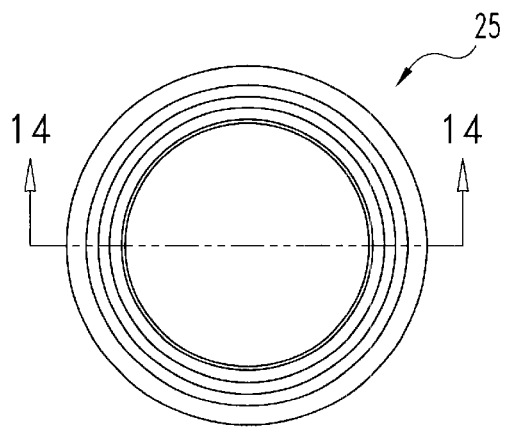
FIG. 12 is a top plan view of a sealing gasket comprising part of the FIG. 1 fuel filter cartridge.
Figure 13:
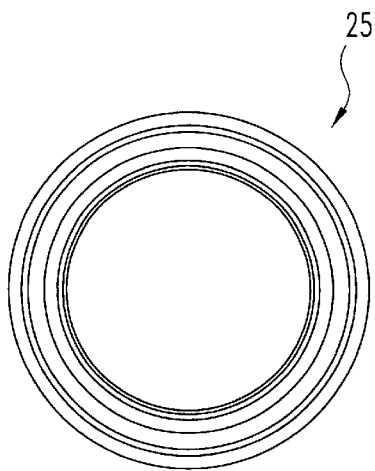
FIG. 13 is a bottom plan view of the FIG. 12 sealing gasket.
Figure 14:
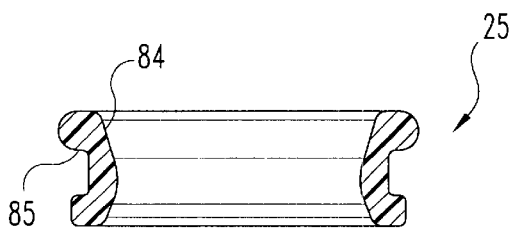
FIG. 14 is a front elevational view in full section of the FIG. 12 sealing gasket as viewed along cutting plane 14—14 in FIG. 12.

At the other end of the filtering media 24, the lower endplate 23 is attached. As shown in FIG. 9, the lower endplate 23 has an upper end portion 64 and a lower end portion 65. The tubular portion 32 of the lower endplate 23 includes a center tube 66 that defines a center post passage 67. The lower endplate 23 includes an end wall portion 68 that is formed at the lower end portion 65 of tube 66. Center tube 66 is sized to extend from end wall portion 68 to the upper endplate 21, when the filter cartridge 20 is assembled. The center post passage 67 is sized to receive the center post 35 of the outer housing 34. In one form, the center tube 66 has a length of approximately 97.5 mm (3.839 inches), and the center post passage 67 has an inner diameter of about 32 mm (1.26 inches). As illustrated in further detail in FIG. 10, end wall portion 68 has an end wall 71 with an outer radial wall 72 extending therefrom towards the upper end portion 64. The center tube 66, end wall 71 and outer radial wall 72 define a filtering media channel 73 in which a portion of the filtering media 24 is received. In one embodiment, the filtering media 24 is epoxied to the lower endplate 23. To ensure proper adhesion of the filtering media 24, end wall 71 has a plurality of concentric adhesion channels 74 defined therein. An enlarged view of the upper end portion 64 is shown in FIG. 11. As illustrated, tube opening end 75 of tube 66 has one or more fluid flow apertures (slots) 76 defined therein. Apertures 76 are used as fluid outlet passages. As compared to other filter designs in which fluid passageways are formed in the middle of the tube, the apertures 76 of the present invention provide a simpler design for fluid passages, which in turn improves the manufacturability of filter cartridge 20. In the illustrated embodiment, center tube 66 has four (4) apertures 76 defined therein that are equally spaced radially from one another. Apertures 76 extend parallel to longitudinal axis L of center tube 66. Each aperture 76 includes a pair of curved upper edges 77 at end 75 and a pair of substantially flat sidewall edges 78 that are joined together at lower curved edge 79. As further illustrated, inner surface 80 of center tube 66 has an inner annular lip (ridge) 81 that is positioned and sized to support the center post gasket 25. By securing gasket 25 in the illustrated manner, lip 81 ensures that gasket 25 properly seals against the center post 35 of the housing 34 even after repeated installations and removals of the filter cartridge 20.

Figure 15:
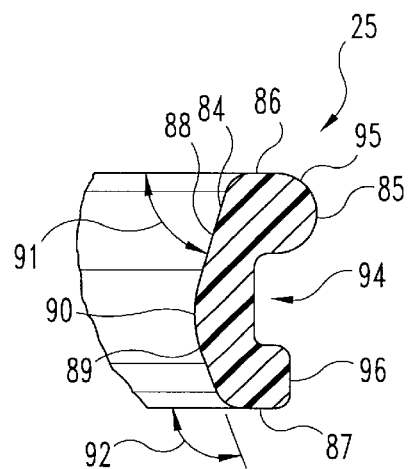
FIG. 15 is an enlarged, partial detail view of one portion of the FIG. 14 sealing gasket.

Center post gasket 25, which is illustrated in FIGS. 12–15, is configured to seal the center post 35 of the housing 34. As shown, center post gasket 25 has a generally cylindrical shape with an inner surface 84 and an outer surface 85. Gasket 25 further has an opposing pair of substantially flat upper 86 and lower 87 surfaces. As illustrated in FIG. 15, inner surface 84 has substantially conical upper 88 and lower 89 portions with a curved seal contact portion 90 provided in between. In one embodiment, upper portion 88 is angled at approximately seventy-three-degrees (73°) with respect to upper surface 86 (angle 91), and lower portion 89 is angled at approximately one-hundred-and-eleven degrees (111°) with respect to lower surface 87 (angle 92). As compared to a conventional o-ring, the contour of the inner surface 84 allows the center post 35 to be easily inserted and removed; while at the same time providing an adequate seal with the center post 35 once the filter cartridge 20 is installed. The outer surface 85 of the center post gasket 25 is constructed to engage the inner lip 81 and seal against the inner surface 80 of the center tube 66. As illustrated, the outer surface 85 has a lip channel 94 defined between a curved ridge 95 and a substantially rectangular ridge 96. Channel 94 is sized to receive the inner lip 81 of the center tube 66. In one embodiment, the inner lip 81 has a width of approximately 2.5 mm (0.98 inches) and the channel has a width of about 3 mm (1.18 inches).

FIG. 16 illustrates the outer housing 34 in which the fuel filter cartridge 20 is received. As shown, the housing 34 has an outer wall 97 and bottom wall 98 that define a hollow interior 99. The outer wall 97 has an annular opening (upper) edge 100 at one end opposite the bottom wall 98. In the illustrated embodiment, the outer housing 34 has a substantially cylindrical shape. As previously mentioned, the housing 34 further includes center post 35, which extends within interior 99. As shown, the center post 35 is tapered, and the center post 35 has successively narrowing portions 101a, 101b, and 101c. Center post 35 further includes a threaded bolt 102, which is used in securing cover 36. Around portion 101c of the center post 35, a bolt opening seal 103 is disposed. In one embodiment, seal 103 is an o-ring seal. A bolt seal retainer 104 is threadedly secured to bolt 102 so as to secure seal 103. Seal retainer 104 has a lower portion 104a with an outer diameter larger that the inner diameter of seal 103 and an upper portion 104b with an outer diameter smaller than the outer diameter of the lower portion 104b.

Cover 36, which is configured to enclose the housing 34 and the filter cartridge 20, is illustrated in FIG. 17. In the illustrated embodiment, the cover 36 has a substantially cylindrical shape. The cover 36 includes an upper lid wall 105, an outer wall 106, an inner wall 107, and a divider wall 108. In the illustrated embodiment, walls 106, 107 and 108 are concentrically arranged annular walls. The upper lid wall 105 has a centrally located bolt opening 109 configured to receive a bolt. As shown, the outer wall 106 extends away from the upper wall 105. The outer wall portion 106 includes an annular upper wall portion 111, an annular lower wall portion 112, and an intermediate wall portion 113 that joins the upper wall portion 111 to the lower wall portion 112. In the illustrated embodiment, upper wall portion 111 has an inner diameter that is less than the inner diameter of the lower wall portion 112. Intermediate wall 113 has an annular shape and is oriented substantially parallel to upper wall 105. Inside surface 114 of the outer wall 106 includes a generally cylindrical lower surface portion 115, an angled transition surface portion 116, a seal relief portion 117, a retainer relief portion 118, and an upper surface 119. Lower portion 115 is sized to fit around the outer wall 97 of the outer housing 34. The angled transition surface 116 extends between the lower portion 115 and the seal relief portion 117. Portion 117 is sized so that outer seal 26 can fit therein. The retainer relief portion 118 is formed in the upper surface 119 next to the seal relief portion 117, and portion 118 is sized such that the seal retainer 22 can fit therein. As shown, a seal engaging ridge 120 is formed between portions 117 and 118. Ridge 120 is sized so as to engage outer seal 26 when the cover 36 encloses the filter cartridge 20 in the housing 34.

As shown in FIG. 17, the divider wall 108 extends from upper wall 111 between the outer wall 106 and the inner wall 107. An outer channel 123 is defined between the outer wall 106 and the divider wall 108. An inner channel 124 is defined between the divider wall 108 and the inner wall 107. The divider wall 108 has an outer channel surface 125 that faces the outer channel 123 and an inner channel surface 126 that faces the inner channel 124. The inner wall 107 defines a center post opening 127 that is sized to receive the seal retainer 104 of the center post 35. As shown, opening 127 along with channels 123 and 124 are concentrically oriented, and opening 127 communicates with bolt opening 109. A fluid inlet passage 128 is defined in upper wall 105 and opens into outer channel 123. Further, the upper wall 105 has a fluid outlet passage 129 defined therein that opens into inner channel 124.

A filter-housing assembly 130 according to one embodiment of the present invention is illustrated in FIG. 18. As shown, center post 35 is inserted into the center tube 66 of the fuel filter cartridge 20. The upper 88 and lower 89 conical portions of the center post gasket 25 allow for easy insertion and removal of the center post 35. During insertion, bolt 102 of the center post 35 passes through bolt opening 109 in the cover 36. Nut 131 is threadedly secured to bolt 102 such that cover 36 is tightly secured to the housing 34. The outer walls 97 of the housing 34 along with the filter cartridge 20 define an outer passage 133, and the center tube 66 of the filter cartridge 20 along with the center post 35 of the housing 34 define an inner passage 134. Once the center tube 66 is completely inserted into the filter cartridge 20, the center post gasket 25 seals against the center tube 66 as shown. During insertion, the annular lip 81 in the center tube 66 supports the center post gasket 25 and ensures that the center post gasket 25 properly seals against the center tube 66. In order to seal center post opening 127 so as to prevent fluid leakage from bolt opening 109, the bolt opening seal 103 on the center post 35 seals against the inner wall 107. The cover 36 encloses the filter cartridge 20 in the housing 34 and forms a number of passageways. As illustrated, the outer channel 123 of the cover 36 and the seal retainer 22 form a fluid inlet passage 136. The inner channel 124 of the cover 36 and the filter cartridge 20 form a fluid outlet passage 137. When the cover 36 is installed, outer seal 26 is received in the seal relief portion 117 of the cover 36, and the seal retainer 22 is received in the retainer relief portion 118. As illustrated, both the outer seal 26 and the opening edge 100 of the housing 34 have substantially equally sized outer diameters. Tightening of bolt 131 causes the cover 36 to compress outer seal 26. Both the upper lip 43 of the seal retainer 22 and ridge 120 press the outer seal 26 against edge 100 so as to seal the outer housing 34. Both fluid inlet passage 136 and outer passage 133 are sealed by this arrangement. In addition, when the cover 36 is attached, the inner seal 27 presses against divider wall 108 in order to seal the fluid inlet passage 136 from the fluid outlet passage 137.

In FIG. 18, the fluid flow path for cleaning the fluid is indicated with arrows C. As shown, dirty fluid (fuel) from inlet passage 128 is received into fluid inlet passage 136. The dirty fluid then passes through slots 47 and channel 60. After passing through channel 60, the fluid enters outer passage 133 and is filtered through filtering media 24. The filtered fluid travels along the center tube 66 and through a fluid passage 140 that is formed between apertures 76 and the upper endplate 21. The filtered fluid then travels between the upper endplate 21 and the inner wall 107 of the cover 36 into the fluid outlet passage 137. From fluid outlet passage 137, the fluid then exits assembly 130 through outlet passage 129. As indicated by flow path D, some of the unfiltered (dirty) fluid may bypass the filtering media 24 by traveling between the lower endplate 23 and the bottom wall 98 of the housing 34. By sealing against the center post 35, the center post gasket 25 prevents this unfiltered fluid from mixing with the filtered fluid in inner passage 134.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A filter cartridge, comprising:
    a filter media to filter fluid, said filter media having a first end and a second end, said filter media defining a passage extending between said first end and said second end;
    a first endplate provided at said first end of said filter media;
    a seal retainer attached to said first endplate, said retainer having an outer body portion and an inner body portion positioned radially inwards with respect to said outer body portion, said outer body portion being constructed and arranged to retain an outer seal, said inner body portion being constructed and arranged to retain an inner seal at a position located radially inwards with respect to said outer seal, said retainer having a central opening aligned with said passage in said filter media, said retainer defining one or more peripheral openings around said central opening;
    a second endplate provided at said second end of said filter media, said second endplate having a tube extending within said passage in said filter media, said tube having an inside surface with an inwardly extending lip extending from said inside surface; and
    a center post gasket having a seal surface to seal against a center post of a filter housing and a lip channel in which said lip of said tube is received.

2. The filter cartridge of claim 1, wherein said center post gasket has an upper conical surface portion, a lower conical surface portion, and a rounded surface portion provided between said upper conical surface portion and said lower conical surface portion.

3. The filter cartridge of claim 2, wherein said center post gasket has a curved ridge and a rectangular ridge defining said lip channel.

4. The filter cartridge of claim 1, wherein said center post gasket has a curved ridge and a rectangular ridge defining said lip channel.

5. The filter cartridge of claim 1, wherein said first endplate and said seal retainer are originally separate components that are attached to one another.

6. The filter cartridge of claim 5, wherein said tube has one or more slots defined in one end of said tube proximal said first end of said filter media.

7. The filter cartridge of claim 6, wherein said first endplate at said first end of said filter media has an inner ring wall received in said passage in said filter media, said inner ring wall and said slots in said tube define a fluid passageway.

8. The filter cartridge of claim 1, wherein said tube has one or more slots defined at one end of said tube proximal said first end of said filter media.

9. The filter cartridge of claim 1, wherein the filter cartridge has a cylindrical shape.

10. A filter cartridge, comprising:
    a filter media to filter fluid, said filter media having a first end and a second end, said filter media defining a passage extending between said first end and said second end;
    a first endplate provided at said first end of said filter media;
    a seal retainer attached to said first endplate, said retainer having an outer body portion and an inner body portion positioned radially inwards with respect to said outer body portion, said outer body portion being constructed and arranged to retain an outer seal, said inner body portion being constructed and arranged to retain an inner seal at a position located radially inwards with respect to said outer seal, said retainer having a central opening aligned with said passage in said filter media, said retainer defining one or more peripheral openings around said central opening;
    a second endplate provided at said second end of said filter media, said second endplate having a tube extending within said passage in said filter media, said tube having a free edge adjacent said first endplate defining one or more slots; and
    a center post gasket received in said tube, said center post gasket having a seal surface to seal against a center post of a filter housing.

11. The filter cartridge of claim 10, wherein said one or more slots is each defined by a pair of sidewall edges that are joined together by a lower edge.

12. The filter cartridge of claim 10, wherein said first endplate and said seal retainer are originally separate components that are attached to one another.

* * * * *